United States Patent
Ito

(10) Patent No.: US 6,583,832 B1
(45) Date of Patent: Jun. 24, 2003

(54) ELLIPSOIDAL POLARIZING PLATE COMPRISING TWO OPTICALLY ANISOTROPIC LAYERS AND POLARIZING MEMBRANE

(75) Inventor: Yoji Ito, Minami-ashigara (JP)

(73) Assignee: Fuji Photo Film., Ltd., Minami-Ashigara (JP)

(*) Notice: Subject to any disclaimer, the term of this patent is extended or adjusted under 35 U.S.C. 154(b) by 0 days.

(21) Appl. No.: 09/671,670

(22) Filed: Sep. 28, 2000

(30) Foreign Application Priority Data

Sep. 30, 1999 (JP) .......................... 11-280705

(51) Int. Cl.⁷ .................. G02F 1/1335; G09K 19/02
(52) U.S. Cl. .................... 349/96; 349/117; 349/118; 349/179
(58) Field of Search ................ 349/96, 118, 117, 349/179

(56) References Cited

U.S. PATENT DOCUMENTS

| 5,583,679 A | 12/1996 | Ito et al. ............ 349/118 |
| 5,646,703 A | 7/1997 | Kamada et al. ............ 349/118 |
| 5,805,253 A * | 9/1998 | Mori et al. ............ 349/118 |
| 6,081,312 A * | 6/2000 | Aminaka et al. ............ 349/118 |
| 6,188,455 B1 * | 2/2001 | Yamamoto ............ 349/76 |

FOREIGN PATENT DOCUMENTS

| DE | 39 11 620 | 10/1990 |
| EP | 0 926 534 | 6/1999 |
| JP | 6-214116 | 8/1994 |
| JP | 7-39524 | 2/1995 |

* cited by examiner

Primary Examiner—Julie Ngo
(74) Attorney, Agent, or Firm—Burns, Doane, Swecker & Mathis, LLP

(57) ABSTRACT

An ellipsoidal polarizing plate comprises two optically anisotropic layers, a polarizing membrane and a transparent protective film. Each of the optically anisotropic layers has a direction giving the maximum refractive index and a plane of the layer. The first optically anisotropic layer has an angle of 5° to 85° between the direction giving the maximum refractive index and the plane. The second optically anisotropic layer is optically positive and uniaxial. The second optically anisotropic layer has an angle of 0° to 5° between the direction giving the maximum refractive index and the layer plane.

10 Claims, 3 Drawing Sheets

ELLIPSOIDAL POLARIZING PLATE COMPRISING TWO OPTICALLY ANISOTROPIC LAYERS AND POLARIZING MEMBRANE

FIELD OF THE INVENTION

The present invention relates to an ellipsoidal polarizing plate and a liquid crystal display.

BACKGROUND OF THE INVENTION

A liquid crystal display of TN (twisted nematic) mode is widely used in combination with an active device such as a TFT (thin film transistor) or MIM (metal insulator metal) device.

The liquid crystal display of TN mode comprises a liquid crystal cell and a pair of polarizing elements.

The liquid crystal cell generally comprises a pair of substrates, rod-like liquid crystal molecules and an electrode layer. The rod-like liquid crystal molecules are provided between the substrates, and the electrode layer has a function of applying a voltage to the rod-like liquid crystal molecules. In the cell of TN mode, an orientation layer is provided on each substrate to align the liquid crystal molecules at the twist angle of 90°.

For improving the viewing angle of the liquid crystal display of TN mode, an optical compensatory sheet (phase retarder) is often placed between the liquid crystal cell and the polarizing element. In this case, the layered body of the polarizing element (polarizing membrane) and the optical compensatory sheet functions as an ellipsoidal polarizing plate. As the optical compensatory sheet, a stretched birefringent film has been conventionally used.

In place of the stretched birefringent film, an optical compensatory sheet comprising an optically anisotropic layer on a transparent substrate has been proposed. The optically anisotropic layer is formed by aligning liquid crystal molecules and fixing the aligned molecules. Since the liquid crystal molecules usually have large birefringence, an optical compensatory sheet obtained by using the liquid crystal molecules has a specific optical characteristic that cannot be obtained by the conventional stretched birefringent film. The optical compensatory sheet for a TN mode comprising discotic liquid crystal molecules is disclosed in Japanese Patent Provisional Publication No. 6(1994)-214116, U.S. Pat. Nos. 5,583,679, 5,646,703 and German Patent Publication No. 3,911,620A1, and the one comprising rod-like liquid crystal molecules is disclosed in Japanese Patent Provisional Publication No. 7(1995)-35924.

SUMMERY OF THE INVENTION

An object of the present invention is to provide an ellipsoidal polarizing plate suitable for a liquid crystal display of TN mode.

The present invention provides an ellipsoidal polarizing plate comprising a first optically anisotropic layer, a second optically anisotropic layer, a polarizing membrane and a transparent protective film, wherein the first optically anisotropic layer has an angle of 5° to 85° between the direction giving the maximum refractive index and the layer plane, and wherein the second optically anisotropic layer is optically positive and uniaxial, and the second optically anisotropic layer has an angle of 0° to 5° between the direction giving the maximum refractive index and the layer plane.

The invention also provides a liquid crystal display comprising a liquid crystal cell of TN mode and two polarizing elements arranged on both sides of the liquid crystal cell, wherein at least one of the polarizing elements is an ellipsoidal polarizing plate comprising a first optically anisotropic layer, a second optically anisotropic layer, a polarizing membrane and a transparent protective film, wherein the first optically anisotropic layer has an angle 5° to 85° between the direction giving the maximum refractive index and the layer plane, and wherein the second optically anisotropic layer is optically positive and uniaxial, and the second optically anisotropic layer has an angle of 0° to 5° between the direction giving the maximum refractive index and the layer plane.

In the present specification, the term "essentially perpendicular" means that the noticed angle is within the range of 90°±20°. The angle is preferably within the range of 90°±16°, more preferably within the range of 90°±12°, further preferably within the range of 90°±8°, and most preferably within the range of 90°±4°.

The term "essentially parallel" means that the noticed angle is within the range of 0°±20°. The angle is preferably within the range of 0°±16°, more preferably within the range of 0°±12°, further preferably within the range of 0°±8°, and most preferably within the range of 0°±4°.

DETAILED DESCRIPTION OF THE INVENTION

Figure 1:
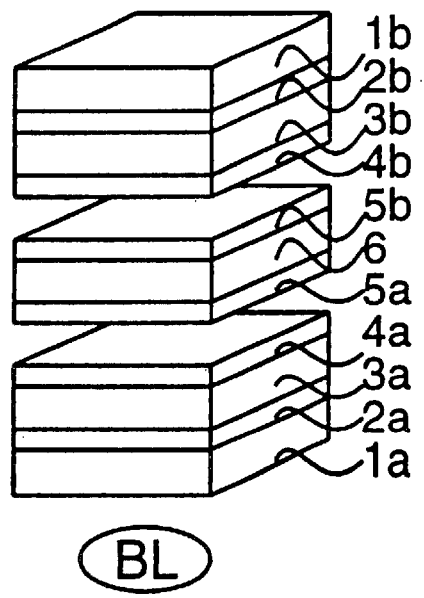
FIG. 1 schematically illustrates a basic structure of a liquid crystal display of TN mode.

FIG. 1 schematically illustrates a basic structure of a liquid crystal display of TN mode.

The display shown in FIG. 1 comprises a transparent protective film (1a), a polarizing membrane (2a), a second optically anisotropic layer (3a), a first optically anisotropic layer (4a), a lower substrate of liquid crystal cell (5a), rod-like liquid crystal molecules (6), an upper substrate of liquid crystal cell (5b), another first optically anisotropic layer (4b), another second optically anisotropic layer (3b), another polarizing membrane (2b) and another transparent protective film (1b), piled up in this order from the side of a back light (BL).

In the structure shown in FIG. 1, the set of the lower substrate of liquid crystal cell, the rod-like liquid crystal molecules and the upper substrate of liquid crystal cell (the set of 5a-6-5b) constitutes a liquid crystal cell of TN mode. Each set of the first and second optically anisotropic layers (each set of 3a-4a and 4b-3b) constitutes an optical compensatory sheet. Each set of the transparent protective film, the polarizing membrane and the first and second optically anisotropic layers (each set of 1a-2a-3a-4a and 4b-3b-2b-1b) constitutes an ellipsoidal polarizing plate.

Figure 2:
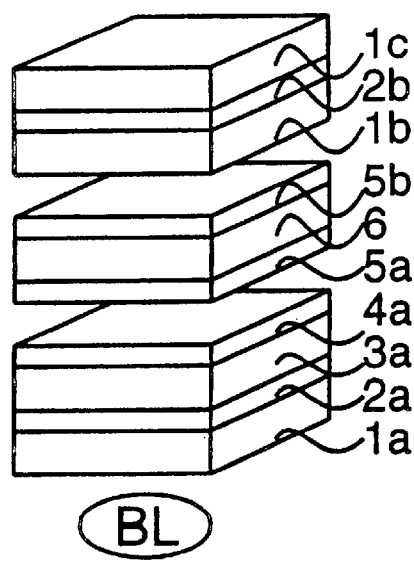
FIG. 2 schematically illustrates another basic structure of a liquid crystal display of TN mode.

FIG. 2 schematically illustrates another basic structure of a liquid crystal display of TN mode.

The display shown in FIG. 2 comprises a transparent protective film (1a), a polarizing membrane (2a), a second optically anisotropic layer (3a), a first optically anisotropic layer (4a), a lower substrate of liquid crystal cell (5a), rod-like liquid crystal molecules (6), an upper substrate of liquid crystal cell (5b), another transparent protective film (1b), another polarizing membrane (2b) and a third transparent protective film (1c), piled up in this order from the side of a back light (BL).

In the structure shown in FIG. 2, the set of the lower substrate of liquid crystal cell, the rod-like liquid crystal molecules and the upper substrate of liquid crystal cell (the set of 5a-6-5b) constitutes a liquid crystal cell of TN mode. The set of the first and second optically anisotropic layers (the set of 3a-4a) constitutes an optical compensatory sheet. The set of the transparent protective film, the polarizing membrane and the first and second optically anisotropic layers (the set of 1a-2a-3a-4a) constitutes an ellipsoidal polarizing plate.

Figure 3:
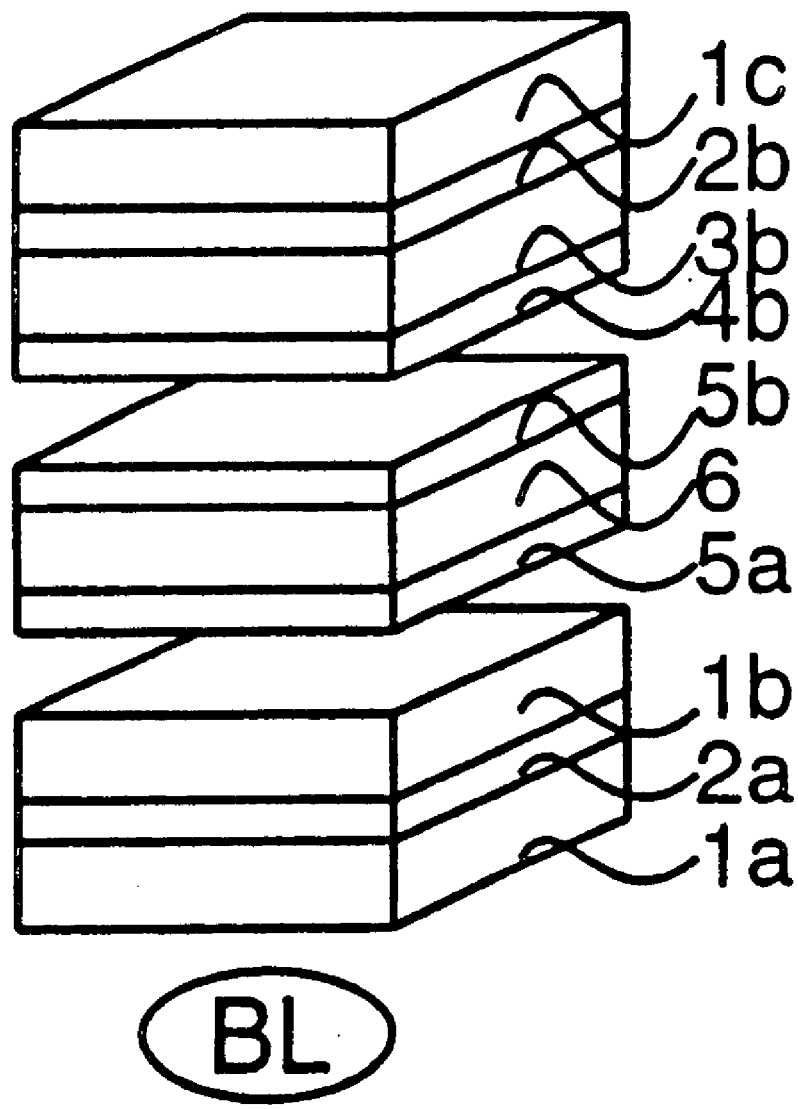
FIG. 3 schematically illustrates a further basic structure of a liquid crystal display of TN mode.

FIG. 3 schematically illustrates a further basic structure of a liquid crystal display of TN mode.

The display shown in FIG. 3 comprises a transparent protective film (1a), a polarizing membrane (2a), another transparent protective film (1b), a lower substrate of liquid crystal cell (5a), rod-like liquid crystal molecules (6), an upper substrate of liquid crystal cell (5b), a first optically anisotropic layer (4b), a second optically anisotropic layer (3b), another polarizing membrane (2b) and a third transparent protective film (1c), piled up in this order from the side of a back light (BL).

In the structure shown in FIG. 3, the set of the lower substrate of liquid crystal cell, the rod-like liquid crystal molecules and the upper substrate of liquid crystal cell (the set of 5a-6-5b) constitutes a liquid crystal cell of TN mode. The set of the first and second optically anisotropic layers (the set of 4b-3b) constitutes an optical compensatory sheet. The set of the transparent protective film, the polarizing membrane and the first and second optically anisotropic layers (the set of 4b-3b-2b-1c) constitutes an ellipsoidal polarizing plate.

As is shown in FIGS. 1–3, the ellipsoidal polarizing plate preferably comprises the first optically anisotropic layer, the second optically anisotropic layer, the polarizing membrane and the transparent protective film in this order. The ellipsoidal polarizing plate can also comprise the second optically anisotropic layer, the first optically anisotropic layer, the polarizing membrane and the transparent protective film in this order.

[First Optically Anisotropic Layer]

Figure 4:
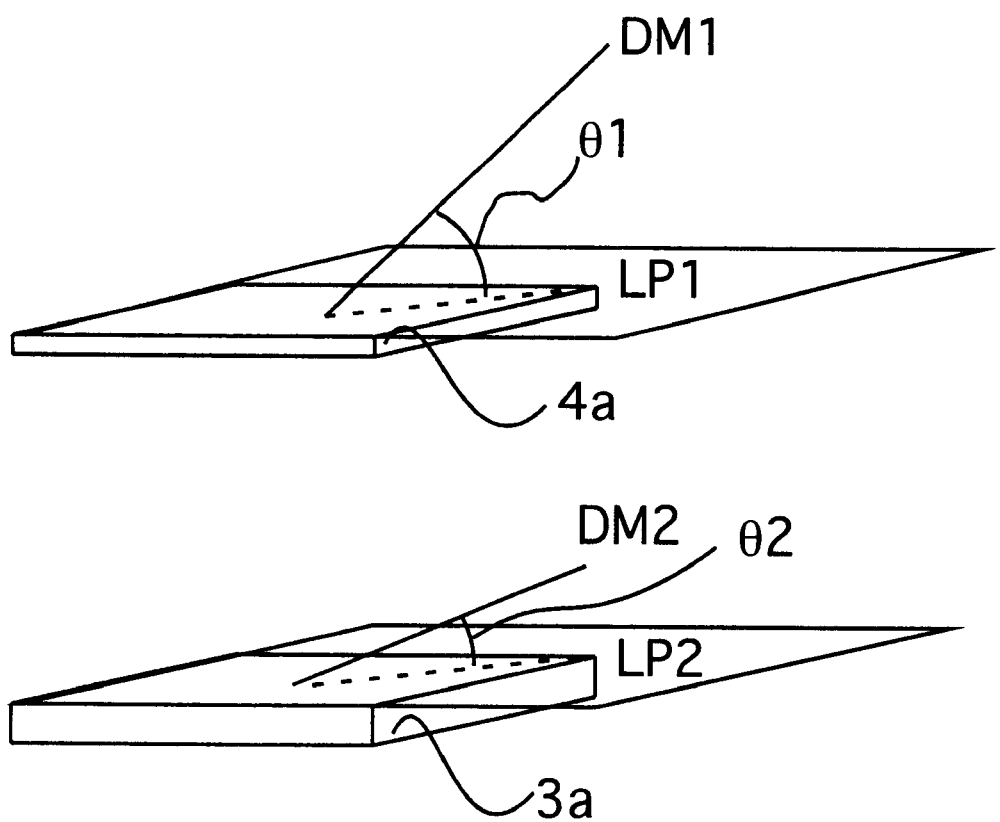
FIG. 4 is a diagram showing the orientation of the maximum refractive index to the layer plane of the optically anisotropic layers, in accordance with the present invention.

In the first optically anisotropic layer, the angle $\theta 1$ between the direction giving the maximum refractive index DM1 and the layer plane LP1 is within the range of 5° to 85° as shown in FIG. 4.

The first optically anisotropic layer can be formed from liquid crystal molecules or from a polymer film. The layer is preferably formed from rod-like liquid crystal molecules oriented in inclined alignment or from a polymer film stretched in an inclined direction. The layer is more preferably formed from the rod-like liquid crystal molecules. In the case where the rod-like liquid crystal molecules are homogeneously aligned, the major axes of the molecules correspond to the direction giving the maximum refractive index. Therefore, when the first optically anisotropic layer is formed from the rod-like liquid crystal molecules, the liquid crystal molecules are aligned so that the average inclined angle (the average angle between the liquid crystal molecules and the layer plane) may be in the range of 5° to 85°. The inclined angle of each rod-like liquid crystal molecule preferably varies according to the distances between the molecule and the surface of the second optically anisotropic layer.

Preferred examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyano-substituted phenylpyrimidines, alkoxy-substituted phenylpyrimidines, phenyldioxanes, tolans and alkenylcyclohexylbenzonitriles. Further, some metal complexes are included in the rod-like liquid crystal molecules.

Descriptions of the rod-like liquid crystal molecules are found in "Kagaku-Sosetsu, Ekisho no Kageku" (written in Japanese), vol. 22 (1994), Chapters 4, 7 and 11; and "Ekisho Devise Handbook" (written in Japanese), chapter 3.

The rod-like liquid crystal molecules preferably have a refractive index of birefringence in the range of 0.001 to 0.7. The rod-like liquid crystal molecule preferably has a polymerizable group. Examples of the polymerizable groups (Q) are shown below.

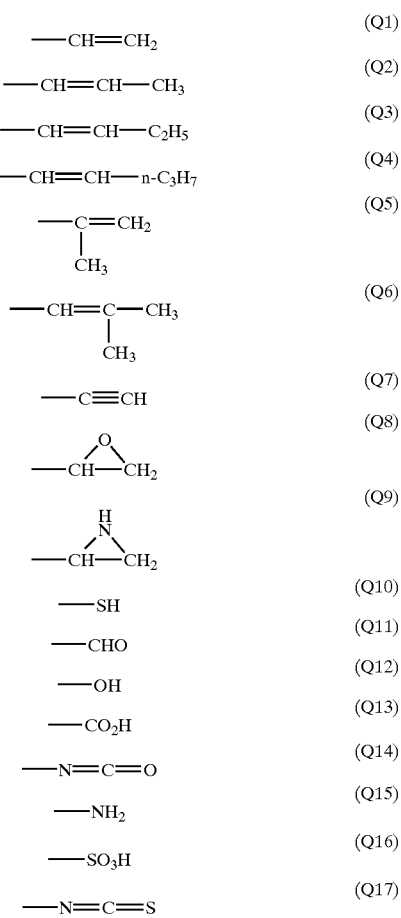

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

Examples of the polymerizable rod-like liquid crystal molecule are shown below.

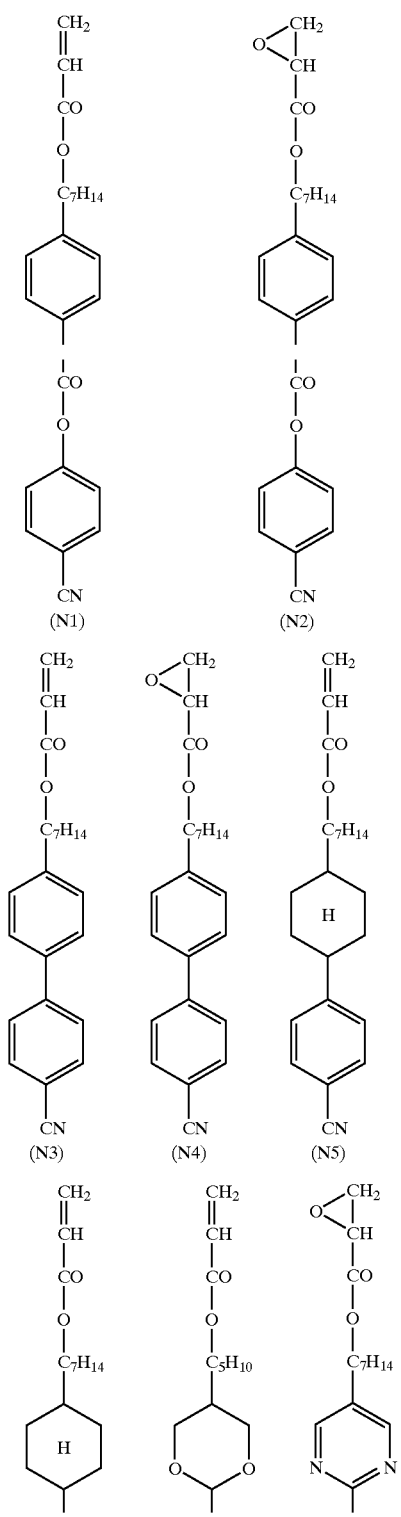
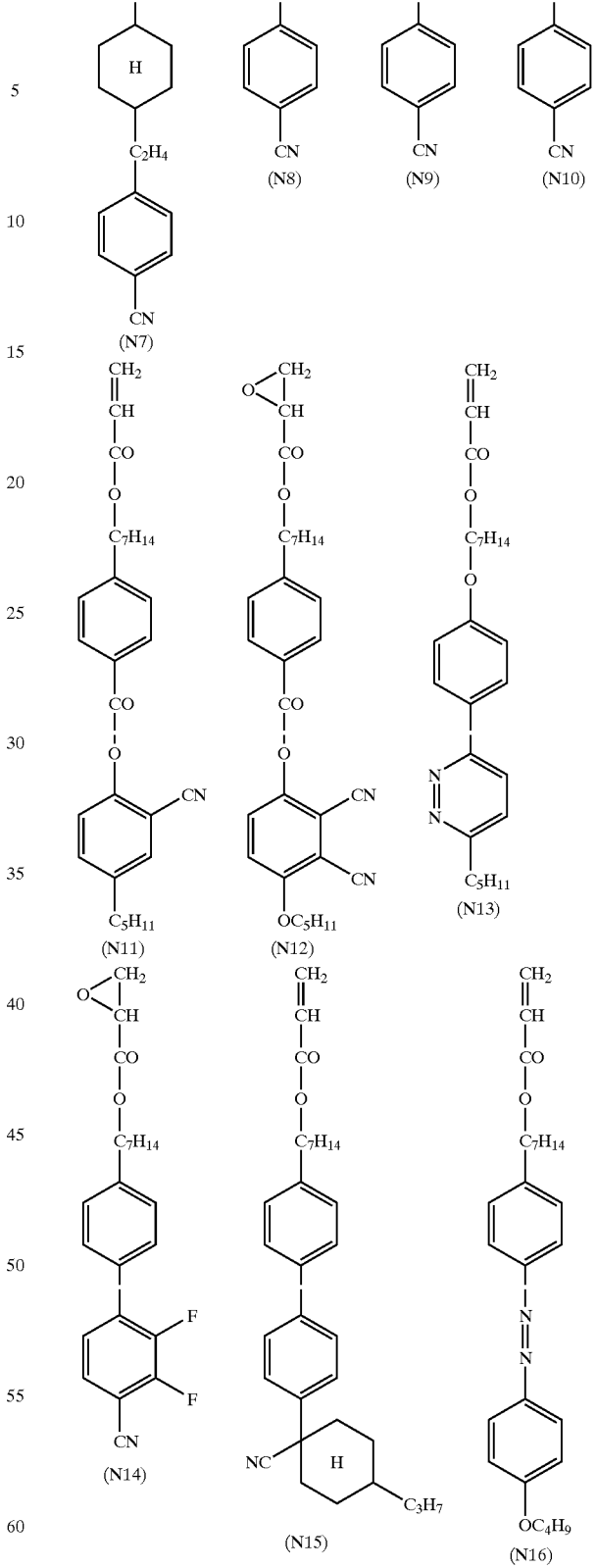

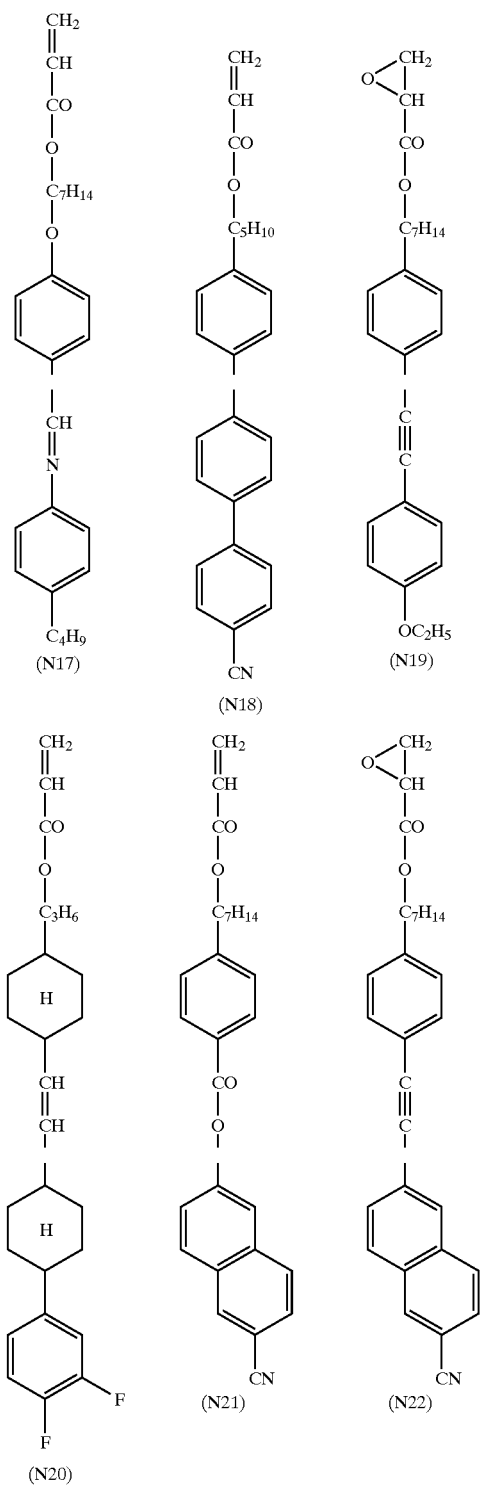
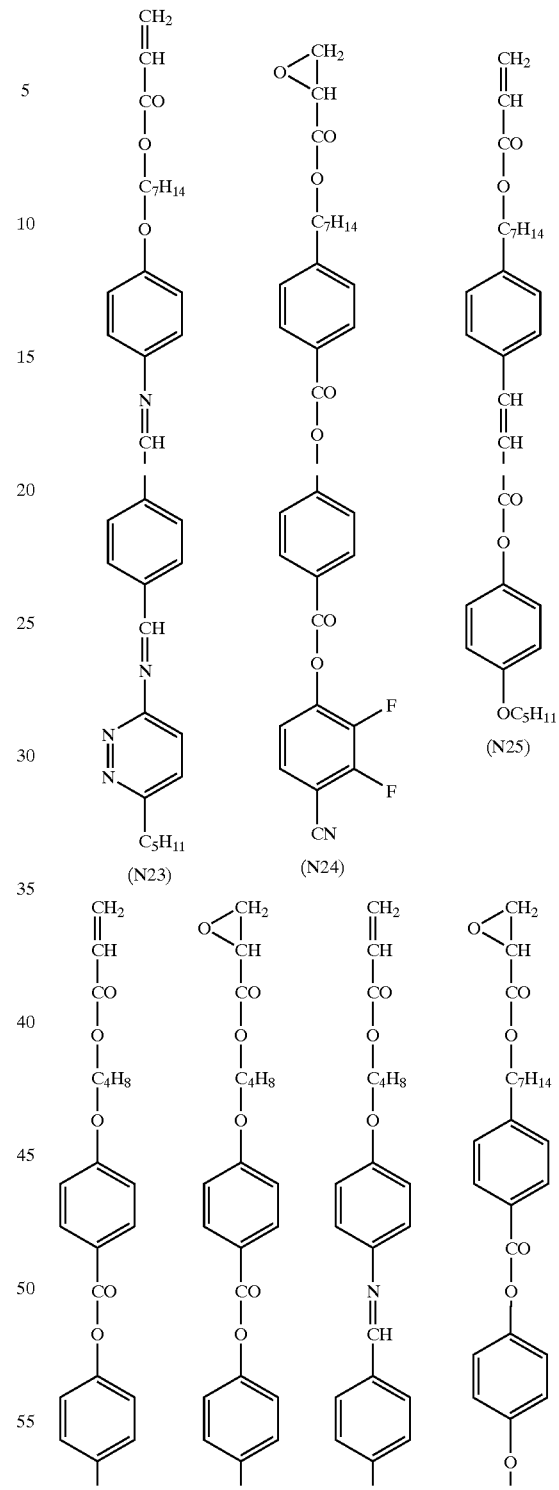

-continued
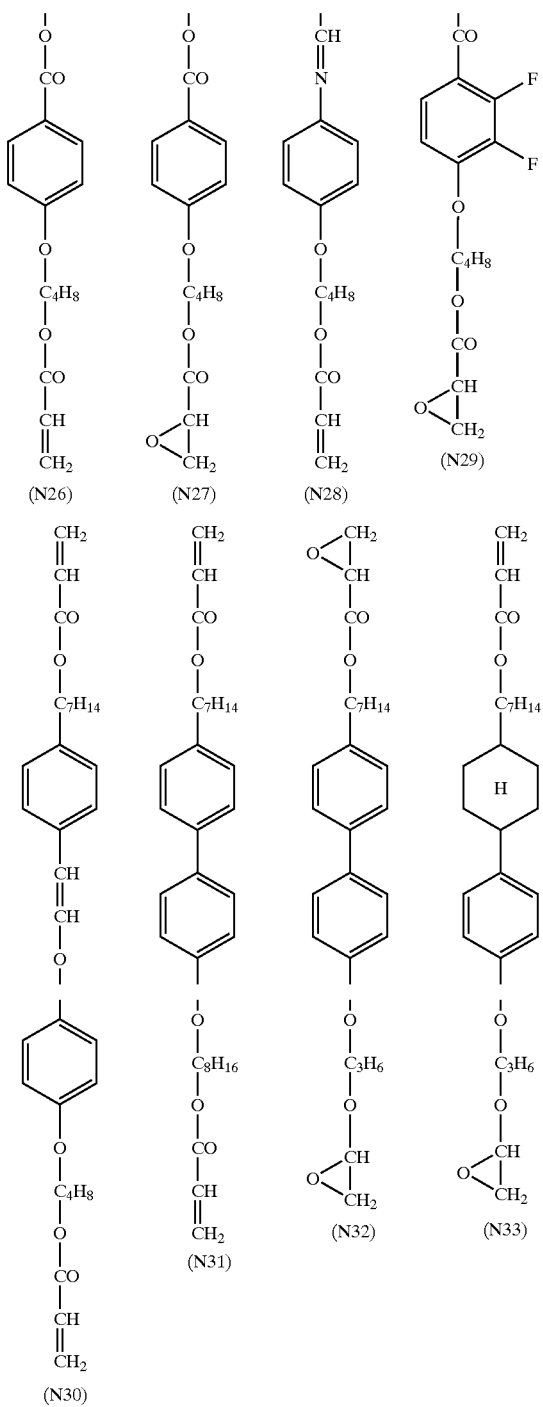
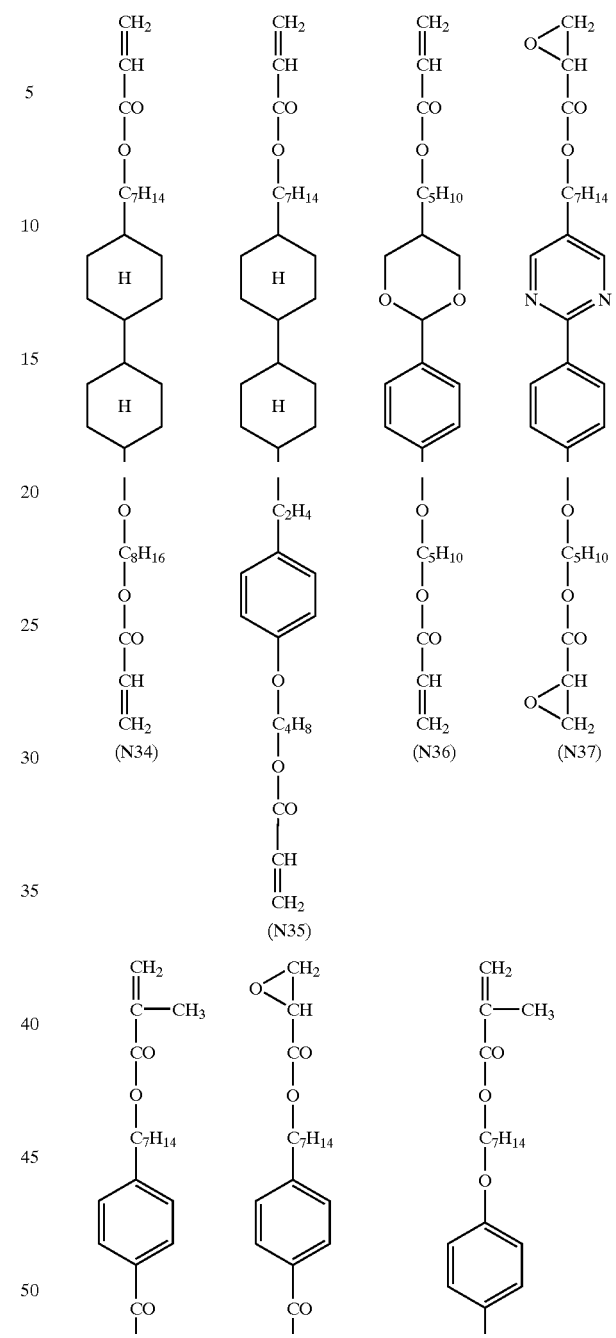

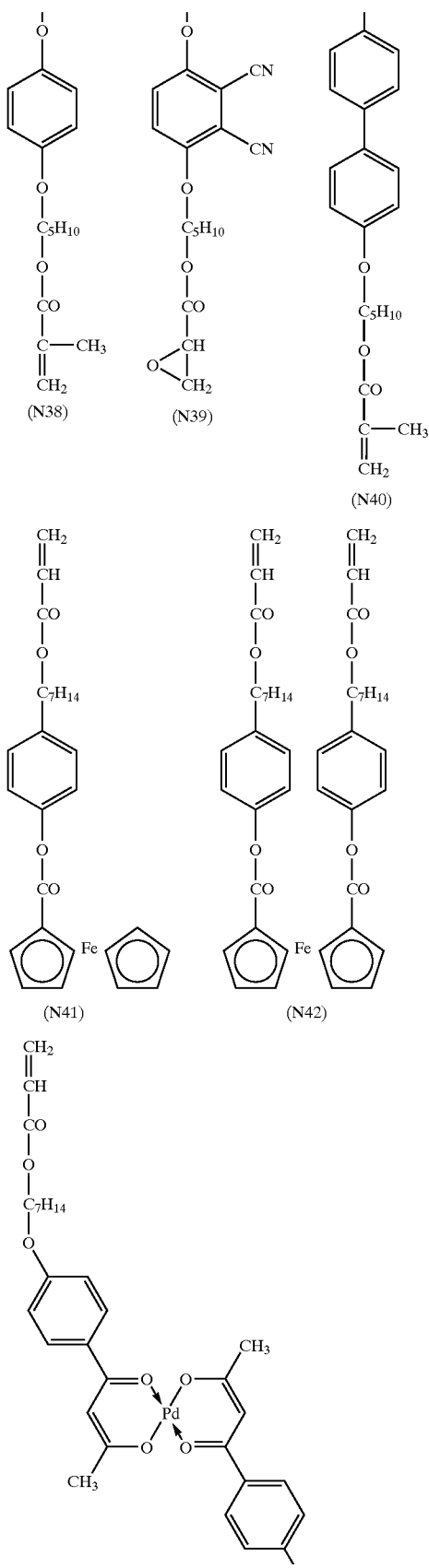
(N38) (N39) (N40)
(N41) (N42)
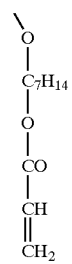
(N43)
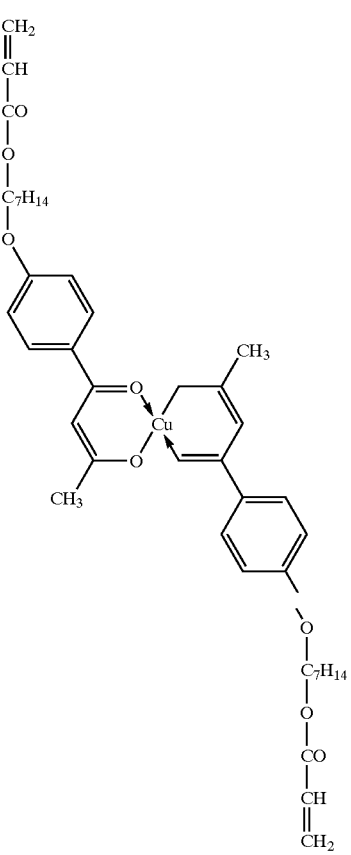
(N44)

-continued

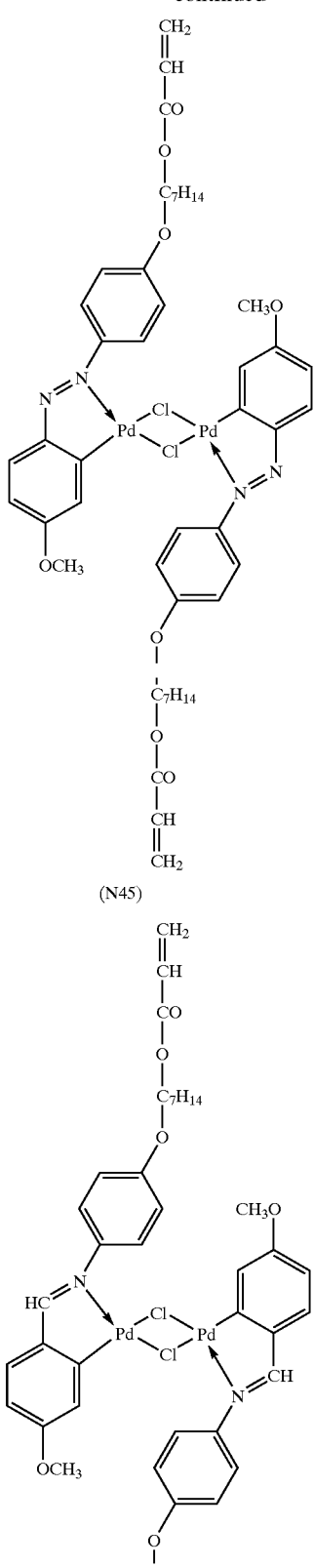

(N45)

-continued

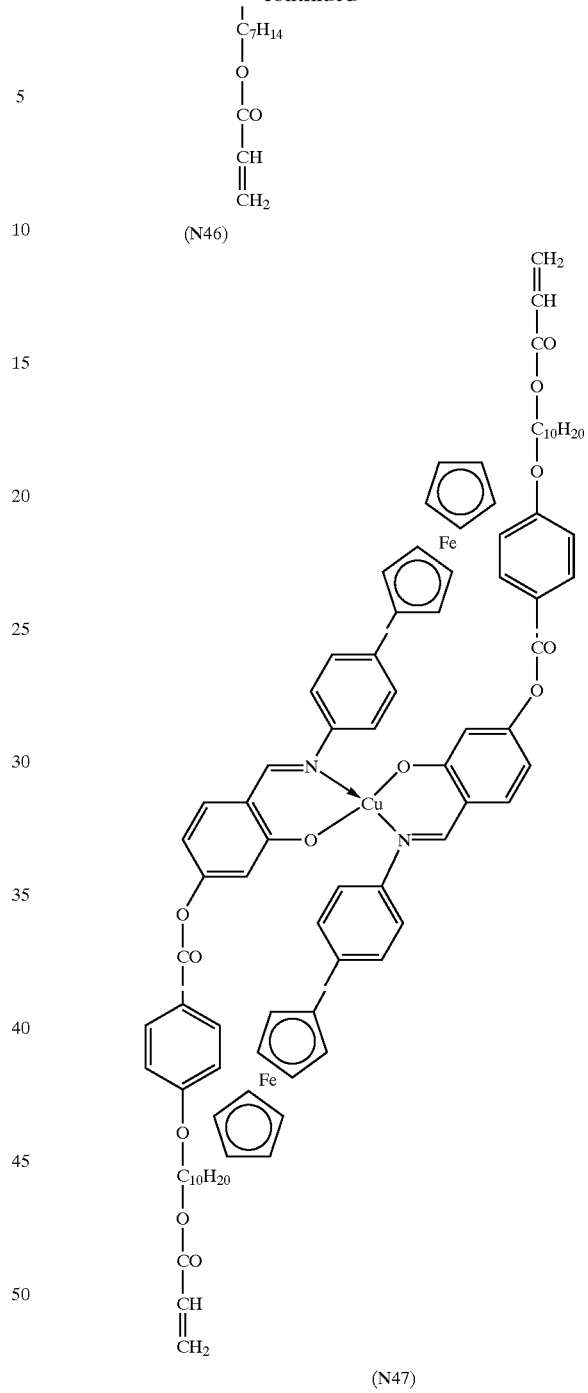

(N46)

(N47)

Two or more rod-like liquid crystal molecules can be used in combination. For example, polymerizable. rod-like liquid crystal molecules can be used in combination with non-polymerizable rod-like liquid crystal molecules.

The first optically anisotropic layer is formed by coating an orientation layer with a liquid crystal composition (coating solution) comprising the rod-like liquid crystal molecules, a polymerization initiator described below and other optional additives (e.g., plasticizer, monomer, surface active agent, cellulose ester). Organic solvents are preferably used for preparing the liquid crystal composition. Examples of the organic solvents include an amide (e.g., dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g., tetrahydrofuran, 1,2-dimethoxyethane). Alkyl halide and ketone are preferred. Two or more organic solvents can be used in combination.

The composition can be coated according to a conventional coating method (e.g., wire bar coating method, extrusion coating method, direct gravure coating method, reverse gravure coating method, die coating method).

It is preferred that the rod-like liquid crystal molecules be homogeneously aligned, and more preferably they are fixed while keeping the alignment. Further preferably, the homogeneously aligned rod-like liquid crystal molecules are fixed by a polymerization reaction. The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating liquid.

The light irradiation for the photo polymerization is preferably conducted by an ultraviolet ray. The exposure energy is preferably in the range of 20 to 50,000 mJ, and more preferably in the range of 100 to 800 mJ. The light irradiation can be conducted while heating the layer to accelerate the photo polymerization reaction.

The first optically anisotropic layer has a thickness preferably in the range of 0.1 to 20 μm, more preferably in the range of 0.5 to 15 μm, and most preferably in the range of 1 to 10 μm.

[Second Optically Anisotropic Layer]

The second optically anisotropic layer is so optically positive uniaxial that the angle θ2 between the direction giving the maximum refractive index DM2 and the layer plane LP1 is within the range of 0° to 5° as shown in FIG. 4.

Preferably, the projection of the direction giving the maximum refractive index in the first optically anisotropic layer onto the layer plane is essentially perpendicular, on the same plane, to the direction giving the maximum refractive index in the second optically anisotropic layer.

The second optically anisotropic layer can be formed from horizontally aligned rod-like liquid crystal molecules 51 or from a horizontally stretched polymer film. It is preferred that the layer be formed from a stretched, particularly uniaxially stretched polymer film.

Examples of the polymer generally used for forming the second optically anisotropic layer include cellulose ester (e.g., cellulose acetate) and synthetic polymer (e.g., polycarbonate, polysulfone, polyethersulfone, polyacrylate, polymethacrylate, norbornene resin). Preferably, the second optically anisotropic layer is formed from a cellulose ester film, a polycarbonate film or a norbornene resin film, and particularly preferably formed from a cellulose ester film.

It is generally known that a cellulose ester film has high optical isotropy (a cellulose ester film is generally known to have low retardation). However, a cellulose ester film having high retardation (i.e., an optically anisotropic cellulose ester film) can be obtained by the method described in European Patent No. 091165656A2, in which the optically anisotropic cellulose ester film is prepared (1) by a retardation increasing agent, (2) by lowering the acetylation degree in the cellulose acetate film, or (3) by the cold dissolution process.

The polymer film is preferably prepared according to a solvent casting method.

The prepared polymer film is generally stretched to obtain optical anisotropy. In detail, through the uniaxial stretching process, the polymer film can be made optically positive uniaxial and the direction of the maximum refractive index can be made essentially parallel to the layer plane.

The uniaxial stretching process is preferably conducted along the longitudinal (spreading) direction of the film. Further, along the direction perpendicular to the uniaxially stretched direction (along the lateral direction if the film is uniaxially stretched along the spreading direction), weak stretching process (i.e., unbalance biaxial stretching process) may be conducted.

The second optically anisotropic layer of polymer film has a thickness in the range of preferably 20 to 500 μm, more preferably 50 to 200 μm.

For improving the adhesion between the second optically anisotropic layer of polymer film and the layer provided thereon (an adhesive layer, the orientation layer or the first optically anisotropic layer), the surface of the second optically anisotropic layer can be subjected to surface treatment (e.g., glow discharge treatment, corona discharge treatment, UV treatment or flame treatment). Further, on the second optically anisotropic layer, an adhesive (undercoating) layer may be provided.

In the case where the second optically anisotropic layer is formed from rod-like liquid crystal molecules, the layer is preferably provided on a transparent support (or on an orientation layer provided on the support). As the support, a cellulose ester film is preferably used.

In the case where the second optically anisotropic layer is formed from rod-like liquid crystal molecules 52, the average inclined angle of the liquid crystal molecules (the average angle θ2 between the liquid crystal molecules and the layer plane) is within the range of 0° to 5°. Except the average inclined angle, the conditions of the liquid crystal molecules are the same as those described for the first optically anisotropic layer.

The second optically anisotropic layer formed from the rod-like liquid crystal molecules has a thickness of preferably 0.1 to 20 μm, more preferably 0.5 to 15 μm, most preferably 1 to 10 μm.

[Orientation Layer]

The rod-like liquid crystal molecules of the first or second optically anisotropic layer are aligned by an orientation layer.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

As the polymer for the orientation layer, a polymer which does not lower the surface energy of the layer (i.e., a polymer generally used for the orientation layer) is preferably used.

The orientation layer has a thickness of preferably 0.01 to 5 μm, more preferably 0.05 to 1 μm.

After the rod-like liquid crystal molecules of the first or second optically anisotropic layer are aligned with the orientation layer, the optically anisotropic layer can be transferred onto the second optically anisotropic layer or the support, respectively. The aligned and fixed rod-like liquid crystal molecules can keep the alignment without the orientation layer.

[Polarizing Membrane]

The polarizing membrane is an iodine polarizing membrane, a dye polarizing membrane comprising a dichromatic dye or a polyene polarizing membrane. The iodine polarizing membrane and the dye polarizing membrane are generally prepared from polyvinyl alcohol films. The transmission (polarizing) axis of the film is perpendicular to the stretched direction.

The second optically anisotropic layer and the polarizing membrane are preferably so arranged that the direction giving the maximum refractive index in the second optically anisotropic layer is essentially perpendicular to the transmission axis of the polarizing membrane.

The second optically anisotropic layer and the polarizing membrane are also preferably so arranged that the direction giving the maximum refractive index in the second optically anisotropic layer is essentially parallel to the transmission axis of the polarizing membrane.

[Transparent Protective Film]

As the transparent protective film, a polymer film is used. The term "transparent" means that the film has an optical transmittance of not less than 80%.

The film is generally a cellulose ester film, preferably a triacetylcellulose film, which is preferably prepared according to the solvent casting method.

The thickness of the film is within preferably 20 to 500 μm, and more preferably 50 to 200 μm.

[Liquid Crystal Display]

The present invention can be applied to liquid crystal displays of various modes. The present invention is particularly effective in a liquid crystal display of TN (Twisted Nematic) mode.

EXAMPLE 1

[Formation of Second Optically Anisotropic Layer]

The cellulose acetate solution consisting of the following components was prepared, and then cast on a drum casting machine to form a cellulose acetate film (dry thickness: 105 μm).

| Cellulose acetate solution | |
|---|---|
| Cellulose acetate (acetic acid content: 60.9%) | 45 weight parts |
| Sumisolve TM165 (Sumitomo Chemical Co., Ltd.) | 2.35 weight parts |
| Triphenyl phosphate | 2.75 weight parts |
| Biphenyldiphenyl phosphate | 2.20 weight parts |
| Methylene chloride | 232.75 weight parts |
| Methanol | 42.57 weight parts |
| n-Butanol | 8.50 weight parts |

The prepared film was stretched (real magnification: ×1.6) to form a second optically anisotropic layer. The retardation of the layer was observed at 633 nm by means of an ellipsometer (M150, JASCO), and found that the retardation values along the thickness direction (Rth) and in the plane (Re) were 85 nm and 100 nm, respectively.

[Formation of First Optically Anisotropic Layer]

On one surface of the second optically anisotropic layer, a gelatin layer was formed. The gelatin layer was then coated with the coating solution consisting of the following components to form an orientation layer of 0.5 μm thickness.

| Coating solution for orientation layer | |
|---|---|
| The following denatured polyvinyl alcohol | 2 weight parts |
| Glutaric aldehyde | 0.1 weight part |
| Water | 98 weight parts |

Denatured polyvinyl alcohol

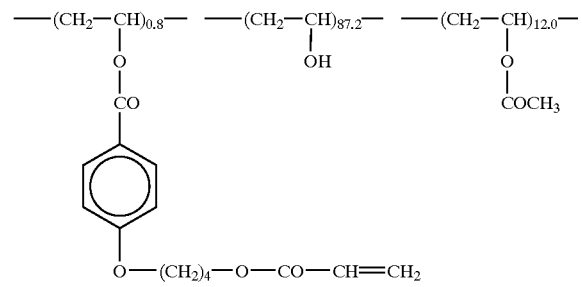

The formed orientation layer was then subjected to a rubbing treatment, and then coated with the coating solution consisting of the following components to form a first optically anisotropic layer (dry thickness: 1.5 μm).

| Coating solution for first optically anisotropic layer | |
|---|---|
| The following rod-like liquid crystal compound | 30 weight parts |
| Methylene chloride | 70 weight parts |

Rod-like liquid crystal compound

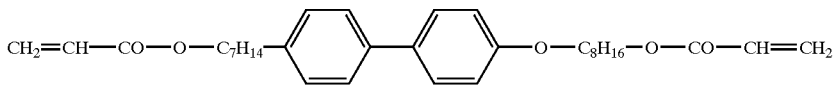

The retardation of the layer was observed at 633 nm by means of an ellipsometer (M150, JASCO), and found that the retardation value along the thickness direction (Rth) was 100 nm and that the angle between the layer plane and the direction giving the minimum refractive index was 50°.
[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was perpendicular to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.
[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between the plates, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

EXAMPLE 2
[Formation of Second Optically Anisotropic Layer]

The norbornene resin solution consisting of the following components was prepared, and then cast on a band casting machine to form a norbornene resin film (dry thickness: 100 μm).

| Norbornene resin solution | |
|---|---|
| Norbornene resin (Arton, JSR Co., Ltd.) | 30 weight parts |
| Methylene chloride | 70 weight parts |

The prepared film was longitudinally stretched (real magnification: ×1.3), and then laterally stretched (real magnification: ×1.15) to form a second optically anisotropic layer.

The retardation of the layer was observed at 633 nm by means of an ellipsometer (M150, JASCO), and found that the retardation values along the thickness direction (Rth) and in the plane (Re) were 85 nm and 100 nm, respectively.
[Formation of First Optically Anisotropic Layer]

After one surface of the second optically anisotropic layer was subjected to corona discharge treatment, an orientation layer and a first optically anisotropic layer were formed thereon in the same manner as Example 1. The optical properties are set forth in Table 1.
[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was perpendicular to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.
[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between the substrates, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

EXAMPLE 3
[Formation of Second Optically Anisotropic Layer]

A commercially available polycarbonate film (Teijin Limited) was longitudinally stretched (real magnification: ×1.3) to form a second optically anisotropic layer. The retardation. of the layer was observed at 633 nm by means of an ellipsometer (M150, JASCO), and found that the retardation values along the thickness direction (Rth) and in the plane (Re) were 100 nm and 150 nm, respectively.
[Formation of First Optically Anisotropic Layer]

After one surface of the second optically anisotropic layer was subjected to corona discharge treatment, an orientation layer and a first optically anisotropic layer were formed thereon in the same manner as Example 1. The optical properties are set forth in Table 1.
[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was perpendicular to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.
[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between them, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

EXAMPLE 4
[Formation of First Optically Anisotropic Layer]

On one surface of the second optically anisotropic layer formed in Example 1, a coating solution comprising 1 weight part of photo-polymerizable oligomer (UN900PEP, Negami Industries Co., Ltd.), 19 weight parts of tetrahydrofuran and a little amount of benzophenone was applied and dried at 60° C. for 30 minutes. A rod-like nematic liquid crystal compound (ZL14788-100, Merck & Co., Inc.) was further applied thereon. To align and fix the liquid crystal molecules, the applied compound was irradiated by UV light while a magnetic field of 5 kG was applied. The direction of the magnetic field had an angle of 70° with the normal of the coated surface in the plane where the normal and the direction perpendicular to the stretching direction of the second optically anisotropic layer were included. The optical properties are set forth in Table 1.
[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was perpendicular to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.
[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between the substrates, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

EXAMPLE 5
[Formation of Second Optically Anisotropic Layer]

A triacetyl cellulose film (FUJI TAC, Fuji Photo Film Co., Ltd.) was used as a transparent support.

On one surface of the support, a gelatin layer was formed. The gelatin layer was then coated with the coating solution consisting of the following components to form an orientation layer of 0.5 μm thickness.

| Coating solution for orientation layer | |
|---|---|
| Denatured polyvinyl alcohol (MP203, Kuraray Co., Ltd.) | 2 weight parts |
| Glutaric aldehyde | 0.1 weight part |
| Water | 98 weight parts |

The formed orientation layer was then subjected to a rubbing treatment, and then coated with the coating solution consisting of the following components to form a second optically anisotropic layer (dry thickness: 1.5 μm).

| Coating solution for second optically anisotropic layer | |
|---|---|
| The rod-like liquid crystal compound used in the first optically anisotropic layer of Example 1 | 30 weight parts |
| Methylene chloride | 70 weight parts |

The retardation of the layer was observed at 633 nm by means of an ellipsometer (M150, JASCO), and found that the retardation values along the thickness direction (Rth) and in the plane (Re) were 100 nm and 150 nm, respectively.
[Formation of First Optically Anisotropic Layer]

On the other surface of the transparent support, a gelatin layer, an orientation layer and a first optically anisotropic layer were formed in the same manner as Example 1. The optical properties are set forth in Table 1.
[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was perpendicular to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.

[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between them, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

TABLE 1

| Ellipsoidal polarizing plate | Angle of maximum refractive index of first layer | Angle of maximum refractive index of second layer | Angle of minimum refractive index of first and second layers |
|---|---|---|---|
| Example 1 | 45° | 0° | 50° |
| Example 2 | 45° | 0° | 50° |
| Example 3 | 35° | 0° | 60° |
| Example 4 | 55° | 0° | 40° |
| Example 5 | 25° | 0° | 70° |

EXAMPLE 6

[Formation of Second Optically Anisotropic Layer]

The following components were placed in a mixing tank, and were stirred while heating to dissolve the components. Thus a cellulose acetate solution was prepared.

| Cellulose acetate solution | |
|---|---|
| Cellulose acetate (acetic acid content: 60.0%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 56 weight parts |
| n-Butanol (third solvent) | 11 weight parts |

In another mixing tank, 16 weight parts of the following retardation increasing agent, 80 weight parts of methylene chloride and 20 weight parts of methanol were placed, and the mixture was stirred while heating to prepare a retardation increasing agent solution.

Retardation increasing agent

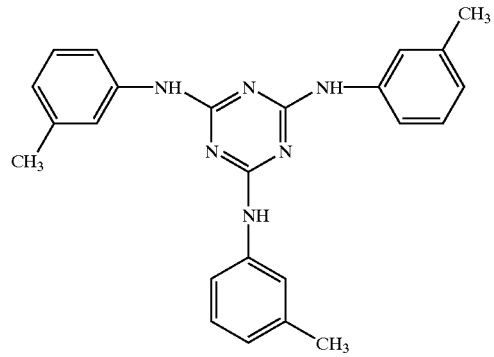

With 474 weight parts of cellulose acetate solution, 56 weight parts of the retardation increasing agent solution was added. The mixture was well stirred to prepare a dope.

The obtained dope was cast on a band casting machine. A film containing the remaining solvent in the amount of 15 wt. % was stretched by using a tenter at the stretching ratio of 35% along the cross direction to prepare a cellulose acetate film as a second optically anisotropic layer.

The retardation of the layer was observed at 550 nm by means of an ellipsometer (M150, JASCO), and found that the retardation values along the thickness direction (Rth) and in the plane (Re) were 130 nm and 105 nm, respectively.

The second optically anisotropic layer was immersed in 1.5N aqueous. solution of potassium hydroxide at 40° C. for 5 minutes. The layer was neutralized with sulfuric acid, washed with pure water, and dried. The surface energy of the treated surface of the layer was 68 mN/m, which was measured according to a contact angle method.

[Formation of First Optically Anisotropic Layer]

The following coating solution was coated on one surface of the second optically anisotropic layer by using a wire bar coater of #16. The coating amount was 28 ml per m². The coated layer was air dried at 60° C. for 60 seconds, and at 90° C. for 150 seconds.

| Coating solution for orientation layer | |
|---|---|
| The denatured polyvinyl alcohol used in Example 1 | 10 weight parts |
| Water | 371 weight parts |
| Methanol | 119 weight parts |
| Glutaric aldehyde (cross-linking agent) | 0.5 weight part |

The formed orientation layer was then subjected to a rubbing treatment along a direction perpendicular to the slow axis (measured at the wavelength of 632.8 nm) of the second optically anisotropic layer.

The coating solution for the first optically anisotropic layer used in Example 1 was coated on the orientation layer to form a first optically anisotropic layer (dry thickness: 1.5 μm).

The retardation of the layer was observed at 633 nm by means of an ellipsometer (M150, JASCO), and found that the retardation value along the thickness direction (Rth) was 100 nm and that the angle between the layer plane and the direction giving the minimum refractive index was 50°.

[Preparation of Ellipsoidal Polarizing Plate]

Iodine was adsorbed onto a stretched polyvinyl alcohol film to prepare a polarizing membrane.

The above-produced optical compensatory sheet was laminated on one surface of the polarizing membrane with an adhesive of polyvinyl alcohol type. The second optically anisotropic layer of the compensatory sheet faces the polarizing membrane, and the direction giving the maximum refractive index in the second optically anisotropic layer was parallel to the transmission axis of the polarizing membrane.

On the other surface of the polarizing membrane, a triacetyl cellulose film (FUJI TAC, Fuji Photo Film Co., Ltd.) of 100 μm thickness was laminated as a transparent protective film with an adhesive of polyvinyl alcohol type. Thus, an ellipsoidal polarizing plate was prepared.

[Preparation of Liquid Crystal Display]

On a glass plate having an ITO electrode, an orientation layer of polyimide was provided and subjected to a rubbing treatment. The procedure was repeated to prepare two substrates, and the prepared substrates were then arranged face-to-face. The orientation layers were arranged inside, and the rubbing directions of the layers were perpendicular to each other. The cell gap was adjusted 4.5 μm with a spacer. Between the substrates, a liquid crystal compound (ZLI-4792, Merck & Co., Inc.) was introduced to prepare a rod-like liquid crystal layer.

Independently, two ellipsoidal polarizing plates were prepared in the above manner. On each surface of the above-prepared liquid crystal cell of a TN mode, each of the plates was laminated. The optically anisotropic layer faces the substrate. Thus, a liquid crystal display was prepared. In each side of the display, the rubbing direction of the orientation layer in the polarizing plate is reversely parallel to that of the neighboring orientation layer in the liquid crystal cell.

The prepared display gave an image of good contrast without reversing the gradation.

What is claimed is:

1. An ellipsoidal polarizing plate comprising:
   a first optically anisotropic layer;
   a second optically anisotropic layer;
   a polarizing membrane; and
   a transparent protective film,
   wherein the first optically anisotropic layer has an angle of 5° to 85° between the direction giving the maximum refractive index and the layer plane, and wherein the second optically anisotropic layer is optically positive and uniaxial, and the second optically anisotropic layer has an angle of 0° to 5° between the direction giving the maximum refractive index and the layer plane.

2. The ellipsoidal polarizing plate as defined in claim 1, wherein the first optically anisotropic layer comprises rod-like liquid crystal molecules.

3. The ellipsoidal polarizing plate as defined in claim 2, wherein the rod-like liquid crystal molecules are so aligned in the first optically anisotropic layer that an inclined angle of each rod-like liquid crystal molecule varies according to the distances between the molecule and the surface of the second optically anisotropic layer.

4. The ellipsoidal polarizing plate as defined in claim 1, wherein the second optically anisotropic layer is a uniaxially stretched polymer film.

5. The ellipsoidal polarizing plate as defined in claim 1, wherein the second optically anisotropic layer is a uniaxially stretched cellulose ester film.

6. The ellipsoidal polarizing plate as defined in claim 1, wherein the first and second optically anisotropic layers are so arranged that the projection of the direction giving the maximum refractive index in the first optically anisotropic layer onto the layer plane is essentially perpendicular, on the same plane, to the direction giving the maximum refractive index in the second optically anisotropic layer.

7. The ellipsoidal polarizing plate as defined in claim 1, wherein the plate comprises the first optically anisotropic layer, the second optically anisotropic layer, the polarizing membrane and the transparent protective film in this order.

8. The ellipsoidal polarizing plate as defined in claim 1, wherein the second optically anisotropic layer and the polarizing membrane are so arranged that the direction giving the maximum refractive index in the second optically anisotropic layer is essentially perpendicular to the transmission axis of the polarizing membrane.

9. The ellipsoidal polarizing plate as defined in claim 1, wherein the second optically anisotropic layer and the polarizing membrane are so arranged that the direction giving the maximum refractive index in the second optically anisotropic layer is essentially parallel to the transmission axis of the polarizing membrane.

10. A liquid crystal display comprising a liquid crystal cell of TN mode and two polarizing elements arranged on both sides of the liquid crystal cell, wherein at least one of the polarizing elements is an ellipsoidal polarizing plate comprising a first optically anisotropic layer, a second optically anisotropic layer, a polarizing membrane and a transparent protective film, wherein the first optically anisotropic layer has an angle of 5° to 85° between the direction giving the maximum refractive index and the layer plane, and wherein the second optically anisotropic layer is optically positive and uniaxial, and the second optically anisotropic layer has an angle 0° to 5° between the direction giving the maximum refractive index and the layer plane.

* * * * *